United States Patent [19]

Masuya et al.

[11] 4,192,344
[45] Mar. 11, 1980

[54] AUTOMATIC EMERGENCY STOP APPARATUS AGAINST COUNTER FLOW AND COUNTER FIRE OF GAS BODIES

[76] Inventors: Yoshiaki Masuya; Terumasa Masuya, both of 2-8, Takaida Higashi, Higashi Osaka City, Osaka, Japan

[21] Appl. No.: 956,337

[22] Filed: Oct. 31, 1978

[30] Foreign Application Priority Data

Nov. 5, 1977 [JP] Japan .................. 52-133246

[51] Int. Cl.² ............................................. F16K 31/12
[52] U.S. Cl. ................................ 137/489.3; 137/463;
137/516.27; 137/512; 137/549
[58] Field of Search ............... 137/463, 489.3, 516.27,
137/545, 549, 494, 512

[56] References Cited

U.S. PATENT DOCUMENTS

| | | | |
|---|---|---|---|
| 1,539,617 | 5/1925 | Williston | 137/516.27 X |
| 2,483,163 | 9/1949 | Warren | 137/549 X |
| 3,252,459 | 5/1966 | Hay | 137/463 X |

FOREIGN PATENT DOCUMENTS 1189821 3/1965 Fed. Rep. of Germany .......... 137/463

Primary Examiner—Harold W. Weakley
Attorney, Agent, or Firm—Armstrong, Nikaido, Marmelstein & Kubovcik

[57] ABSTRACT

An automatic emergency stop apparatus which prevents counter flow and counter fire of gas bodies. The apparatus comprises a check valve, a cut-off valve and a filter unit. The check valve is positioned in the gas inlet portion of a decomposable closed-type valve casing. The check valve is opened only by inflow gas pressure. The cut-off valve engages with a portion of a safety apparatus operated by counter pressures created during counter flow and counter fire conditions. The safety apparatus causes the cut-off valve to automatically stop the flow of gas upon the application of counter pressure. The cut-off valve is positioned in the apparatus gas outlet. The filter unit, which is adapted to buffer the counter pressures caused during the production of the counter fire and to remove carbon sludges, is interposed between the check and cut-off valves.

6 Claims, 6 Drawing Figures

AUTOMATIC EMERGENCY STOP APPARATUS AGAINST COUNTER FLOW AND COUNTER FIRE OF GAS BODIES

BACKGROUND OF THE INVENTION

1. Field of the Invention

The present invention relates to an automatic emergency stop apparatus for preventing counter flow and counter fire of gaseous bodies in gas conveying pipes.

2. Description of the Prior Art

When counter flows and counter fires are caused in gas installation piping, obstacles and explosion hazards are caused throughout the installation piping. Two methods have been considered for preventing these disadvantages. One has been the removal of the causes for the production of counter flows and counter fires and the other has been the mitigation of counter pressures caused by impact waves and preventing the diffusion of counter flames when the counter flows and the counter fires have been caused.

Counter flows can be prevented through the utilization of conventionally known check valves in the gas flow passage. However, substantial accessory structures are required to prevent counter fires from being caused. In addition, pressure, temperature, etc. of the gas has to be taken into consideration. It is extremely difficult, in terms of technique, to prevent counter fires from being caused; and as a result it is still impossible to completely prevent counter fires. Accordingly, at the present time, research and development is performed only on the mitigation of impact waves and the prevention of counter-fire diffusion. The present invention is developed along this policy.

One technique for counter-pressure mitigation and counter fire diffusion prevention in conventional gas appliances is disclosed in Japanese Patent Publication No. 7983/1958. According to this patent, a by-pass is formed in the gas flow passage so that the gas flows through the by-pass during normal gas flow. During the production of counter fires, a check valve installed in the flow passage is depressed by the counter pressure to close the gas flow inlet of the flow passage and the by-pass, so that the counter-fire propagation can be prevented. In this case, the impact waves are not mitigated at all, and an excessive pressure condition exists inside the flow passage. Thus, there remains disadvantages in that damage is likely to be caused in places inside the flow passage.

SUMMARY OF THE INVENTION

It is an object of the present invention to instantly and automatically prevent the diffusion of counter pressure and counter fire during production of counter flow or counter fire to mitigate impact waves caused through counter fires and to prevent counter-fire-produced carbon sludges from going into and attaching to the apparatus.

Another object of the present invention is to provide an apparatus which is easily restored to a normal operating position after an emergency actuation.

Still another object is to provide an apparatus having a check valve disposed in a gas flow inlet portion and a cut-off valve disposed in a gas flow outlet portion, the cut-off valve being normally urged towards a gas shut-off position to cut off the counter flame and the gas supply.

A further object is to provide an apparatus having a filter unit disposed between the check valve and the cut-off valve, the filter unit being adapted to mitigate counter pressures, extinguish counter flames, and absorb and remove counter-fire caused carbon sludge.

A still further object is to provide a safety apparatus which is adapted to operate through the counter pressure to discharge the counter pressure out of the apparatus. The safety apparatus is detachably engaged with the cut-off valve, the engagement therebetween being retained during normal gas flowing operation, when counter flow or counter pressure works upon the safety apparatus, causing the safety apparatus to become disengaged from and to release the cut-off valve, for automatically shutting off the gas flow outlet.

The present invention is directed to an automatic emergency stop apparatus for protecting against the dangers of counter flow and counter fire of gas comprising a hollow valve body including a gas flow inlet and a gas flow outlet. A check valve is positioned adjacent the gas flow inlet and is biased by a spring towards a closed position. A cut-off valve is positioned adjacent the gas flow outlet and is biased by a spring towards a closed position. A safety apparatus communicates with the interior of the valve body. The safety apparatus includes a plunger adapted for engagement with the cut-off valve. In an operative normal gas flow state, the plunger engages with the cut-off valve and maintains the cut-off valve in an open position. In an emergency stop state the plunger is moved out of contact with the cut-off valve thereby permitting the cut-off valve to close under the force of the cut-off valve biasing spring to stop the flow of gas.

BRIEF DESCRIPTION OF THE DRAWINGS

These and other objects and advantages will become more fully apparent as the following description is read in conjunction with the drawings, wherein.

DESCRIPTION OF THE PREFERRED EMBODIMENTS

Figure 3:
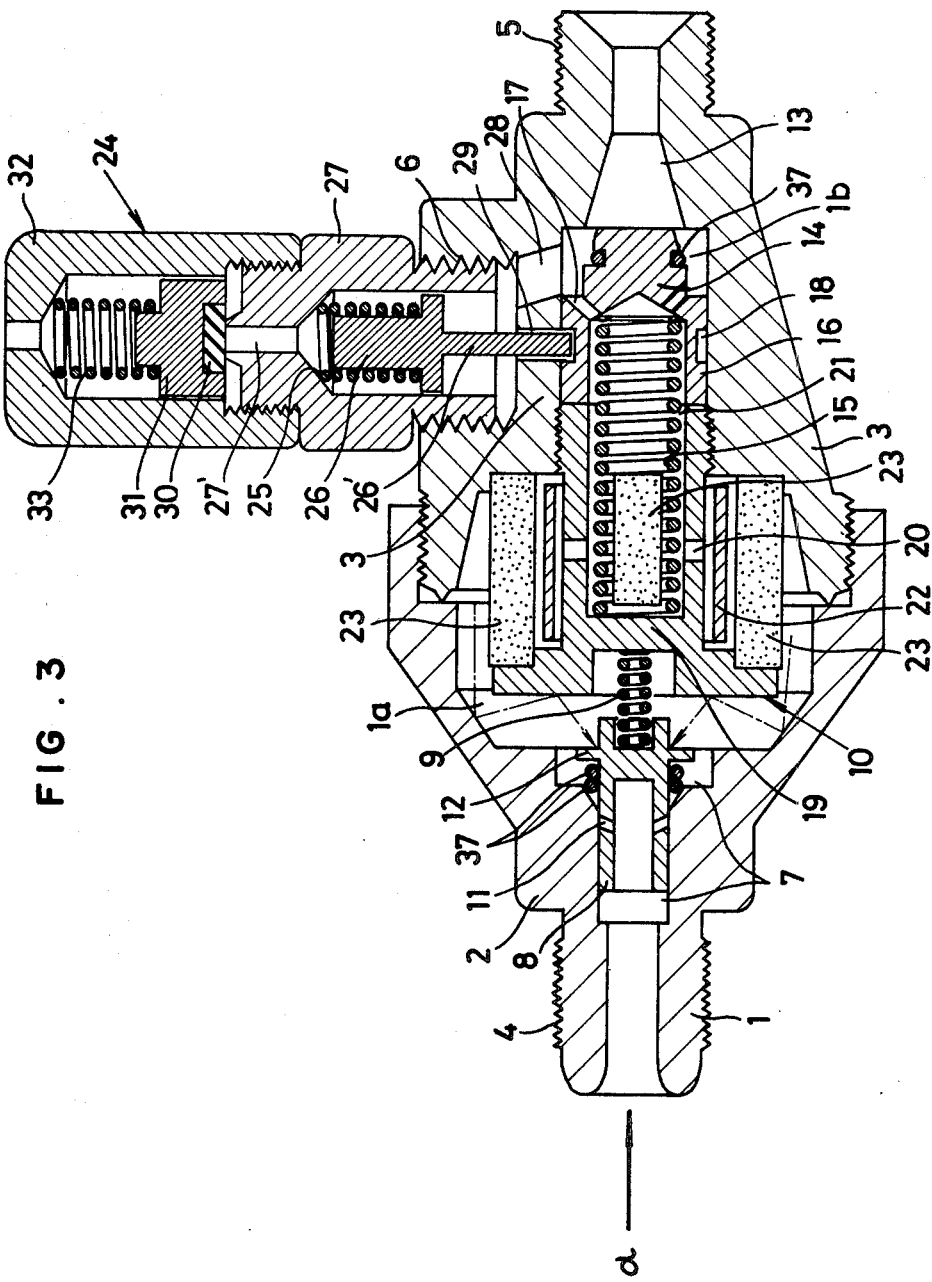
FIG. 3 is a longitudinal sectional view of a first embodiment showing the normal operating position of the apparatus of the present invention.

As illustrated in FIG. 3, a hollow valve body 1 is formed by an inlet side casing 2 and an outlet side casing 3, each of the case halves being threadedly joined. A threaded inlet 4 and a threaded outlet 5 are provided at opposite ends of the valve body for connection with the gas installation piping. A tapped hole 6 is provided in the outlet side casing 3 for connection of the safety apparatus 24 to be described later.

A check valve 8 is provided in a gas flow inlet 7 portion inside the valve body 1, the check valve 8 is being adapted to be opened from a normally closed position only by the pressure of gas flowing into the inlet in the direction indicated by an arrow labeled X. In FIG. 3 the check valve 8 is halfway slidably engaged with the gas flow inlet 7 of the valve body 1. The rear end (right end in the drawing) of the check valve is elastically supported by a compression spring 9 interposed between the check valve and a filter unit 10. The spring 9 urges the check valve 8 to assume a closed position. The portion of the check valve 8 adapted to engage with the gas flow inlet 7 is formed having a hollow barrel which communicates with the gas supply source. Vent holes 11, are formed in the hollow barrel portion wall. A flange portion 12, which is larger in area than the hollow barrel portion form in a rear end portion of the check valve 8.

A cut-off valve 14 is provided in the gas flow outlet portion 13 of the case 1. The cut-off valve 14 is elastically urged by a compression spring 15 disposed between the filter unit 10 and the cut-off valve 14. The cut-off valve is normally urged towards a position closing the gas flow outlet 13 by the compression spring 15. The cut-off valve is adapted to operatively cooperate with the safety apparatus 24 to be described later. As seen in FIG. 3, the tip end is formed into a sealable tapering shape permitting close adherence with the gas flow outlet 13. The base portion of the cut-off valve 14 is formed into a cylindrical barrel portion 16. A ring-shaped or annular groove 18 is also formed on the outer periphery of the barrel portion 16. The groove 18 engages with the safety apparatus 24. The spring 15 should have an elastic force larger than the counter pressure during the counter fire and the counter flow.

The filter unit 10 is interposed between the check valve 8 and the cut-off valve 14 in the hollow valve body. As seen in FIG. 3, the filter unit 10 is of an approximately cylindrical shape. A filter case 19 having vent holes 20,20 provided in the wall of the cylindrical portion is threadedly secured to the outlet side casing 3 to divide the hollow portion inside the valve body 1 into a front portion 1a and a rear portion 1b. The hollow front portion 1a is communicated with the rear portion 1b through a gas passage 21 comprised of the vent hole 20, the cylindrical interior of the filter case and the vent hole 17 of the cut-off valve 14. A gas flow obstruction plate 22 is provided which loosely covers the vent holes 20,20 of the filter case 19. A filter 23 having fine through-holes therein is provided surrounding the cylindrical flow obstacle plate 22 and filter 23. The filter 23 is preferably made of a sintered alloy which is high in heat and impact resistance. Examples of suitable sintered metals are stainless material, nickel material, chromiummaterial, titanium material, etc. or alloys with these metals therein. Also, the filter 23, formed of the same material as filter 23 may be of the same material disposed within the filter case 19 where necessary.

The safety apparatus 24 is adapted to operate through the counter pressures or the impact waves caused during production of the counter flow and the counter fire to discharge the counter pressures out of the apparatus. The safety apparatus 24 engages with the concave groove 18 of the cut-off valve 14 and releases the engagement simultaneously with the safety valve operation. The safety apparatus 24 as seen in FIG. 3, is comprised of a case 27 with a stopper 26 disposed therein. The stopper 26 is normally depressed downwardly by a compression spring 25 mounted in the tapped hole 6 of the outlet side casing 3. The interior of the valve body 1 communicates with a gas escape hole 28 formed in the bottom portion of the tapped hole 6. The shaft portion 26' of the stopper 26 extends through the stopper hole 29 such that the tip end of the shaft portion 25 engages in the annular groove 18 of the cut-off valve 14. An opening 27' is formed in a top face of the casing 27 to permit gas to blow therethrough. A bushing 31 having a packing 30 is positioned against the opening 27'. The bushing 31 is located inside a cap 32 threadedly mounted on the casing 27 and is normally depressed downwardly by a compression spring 33 provided inside the case.

Figure 1:
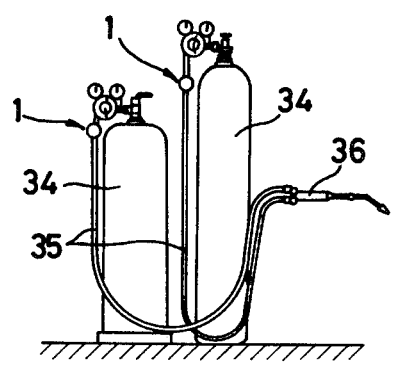
FIG. 1 is a simplified schematic view of a typical gas installation showing the positioning of the safety apparatus of the present invention.
Figure 2:
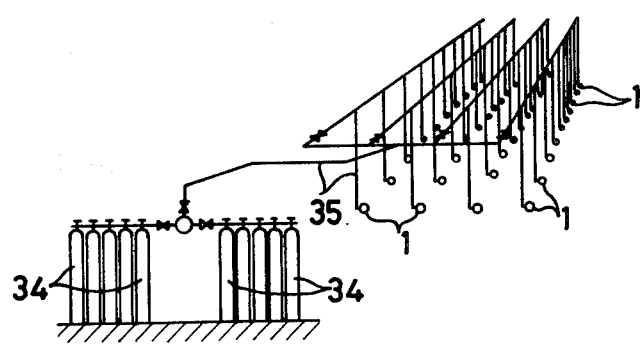
FIG. 2 is a simplified schematic view of another typical gas installation showing the positioning of the safety apparatus of the present invention.

Referring to FIGS. 1 and 2, a gas bomb 34, a piping 35 and a combustion portion 36 are illustrated. Referring to FIG. 3, a pair of rubber O-rings 37 are illustrated. The O-rings 37 are mounted on the check valve 8 prevent carbon sludges (caused during counter fire) from entering the engaging portion through the check valve 8 and the gas flow inlet 7. The provision of two O-rings as shown, further improves the prevention of carbon sludges from entering the engaging portion and the prevention of gas from flowing backwardly.

The operation of the apparatus of the present invention constructed as described hereinabove will now be described.

In a case where gas is flowing to a combustion chamber 36 through the apparatus of the present invention from a gas supply source 34, the apparatus will appear as shown in FIG. 3. That is, the gas depresses and slides the check valve 8 against the action of spring 9 and opens the vent hole 11 to permit the gas to continue to flow into the hollow front portion 1a inside the casing. After the gas has passed through the filter 23, it flows to the hollow rear portion 1b inside the case through the vent hole 20 of the filter case 19 and a gas passage comprised of the cylindrical interior and the vent hole 17 of the cut-off valve 14. The gas flows from the gas flow outlet 13 to the combustion portion (not shown).

On the other hand, when counter flow has been produced due to some causes, namely when gas pressure on the outlet side 8 has become greater than the pressure on the inlet side a, the gas flows from the cut-off valve 14 to the check valve 8 in an order opposite to the above-described order. The pressure of the gas itself works upon the back of the check valve 8. The check valve 8 is automatically double-acted through the restoring force of the spring 9 to close the vent hole 1. Also, when counter fires have been caused, the impact waves and counter flames through the counter fire are generally different in propagation rate. The impact waves go first and pass through the gas escape hole 28 from the outlet side 8 to work upon the underside of the stopper 26 inside the safety apparatus casing 27 for raising the stopper against the elasticity of the spring 25. In the same manner, the impact waves work upon the underside of the bush 31 through the opening 27' to lift it to exhaust the gas outside from the opening of the cap 32. However, upon operation of the safety apparatus as described hereinabove, namely, upon raising of the stopper 26, the engagement between the shaft portion 26' of the stopper and the annular groove 18 of the cut-off valve 14 is released. The cut-off valve 14 is depressed through the restoring force of the spring 15 to automatically close the gas outlet 13 thereby to cut off the counter flames, which follow the impact waves and diffuse into the apparatus.

Also, if the impact waves or the counter flames are propagated and diffused into the apparatus through the gas passage 21 from the vent hole 17 of the cut-off valve 14 before the stopper 26 is operated, the impact waves are buffered and the counter flames are extinguished through the function of the filters 23 and 23' and the flow obstruction plate 22. Also, when the impact waves cannot be buffered, they work upon the rear face of the check valve 8 to close the gas flow inlet 7. In addition, the carbon sludge accompanied by the counter flames are absorbed by the filters 23 and 23'. Thus, the carbon sludges do not reach the check valve 8 and reduce the performance of the check valve 8.

Figure 4:
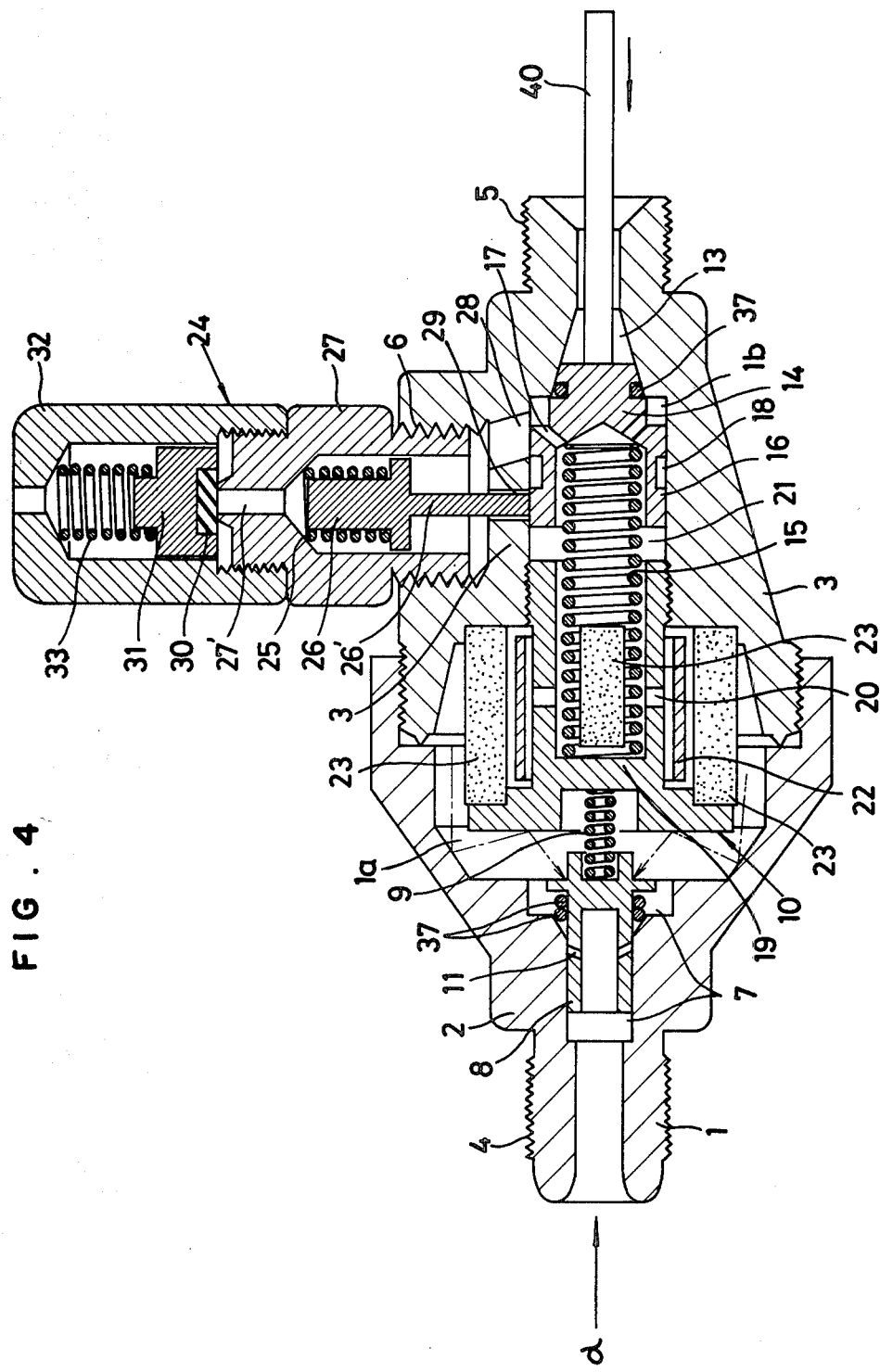
FIG. 4 is a longitudinal sectional view showing the position of the apparatus of the present invention after activation by counter pressure to assume an emergency gas cut-off position.

As described hereinabove, after the apparatus of the present invention has been operated in response to the production of the counter flow or counter fire, the supply valve of the gas supplying source is closed. A pipe (not shown) threadedly connected to the outlet side case 3 is removed and a rod body 40 shown in FIG. 4 is inserted into the gas flow outlet 13. The cut-off valve 14 is pressed against the elasticity of the spring 15. The annular groove 18 of the cut-off valve 18 is again engaged with the shaft portion 26' of the stopper 26 to enable the apparatus of the present invention to be re-used.

According to the embodiment of FIG. 3 as described hereinabove, the gas flow inlet 7 can be cut off positively by the check valve 8 in the case of mere counter flow only. Also, during the production of counter fires, first, the impact waves produced by the counter fires are discharged from the safety apparatus 24 to prevent the impact waves from damaging the interior of the apparatus. In addition, simultaneously with the actuation of the safety apparatus by the impact waves, the engaging condition of the cut-off valve 14 through the safety apparatus is adapted to be released. Thus, the cut-off valve 14 closes the gas flow outlet 13 immediately to cut off the entry and diffusion of the counter flames, which follow the impact waves into the apparatus. The check valve 8 is operated by the impact waves entered into the apparatus before the gas flow outlet 13 is closed to close the gas flow inlet 7 thereby cutting off the inflow of gas whereby the secondary flame harms can be completely prevented from being produced. Also, even when the impact waves or counter flames are propagated and penetrate into the passage 21 through the vent hole 17 before the safety apparatus 24 is actuated, the vent hole 17 which constitutes the gas passage 21 is extremely narrow as shown in FIG. 3 as compared with the passage to the safety apparatus 24, namely, the gas escape hole 28 and the penetration of the impact waves and counter flames is thereby reduced. In addition, the gas passage 21 makes the other vent holes 20 narrower and the cylindrical portion is made larger in space. Furthermore, the filter 23 is provided to completely buffer the impact waves and extinguish the counter flames.

Also, as the flow obstruction plate 22 and the filter 23 are installed on the outer side of the filter case 19, further improved impact wave buffering and counter flame extinguishing effects can be obtained. Since the carbon sludges accompanied by the counter flow and counter fire are absorbed by the filters 23 and 23', they will not enter the hollow front portion 1a of the case to interfere with the operation and performance of the check valve 8. Even if the impact waves pass through the gas passage 21 and the filter 23 to reach to the hollow front portion 1a of the case, the counter pressure will act upon the rear face of the check valve 8 as shown by the broken line and arrow in FIG. 3 to close the check valve 8.

Furthermore, according to the present invention, the body case 1 is divided into two cases, namely, an inlet side and an outlet side which are detachably joined. Accordingly, the internal filters 23 and 23' can be easily replaced and the apparatus can be easily cleared.

While FIG. 3 illustrates an embodiment of the present invention, further embodiments of the present invention will now be described.

Figure 5:
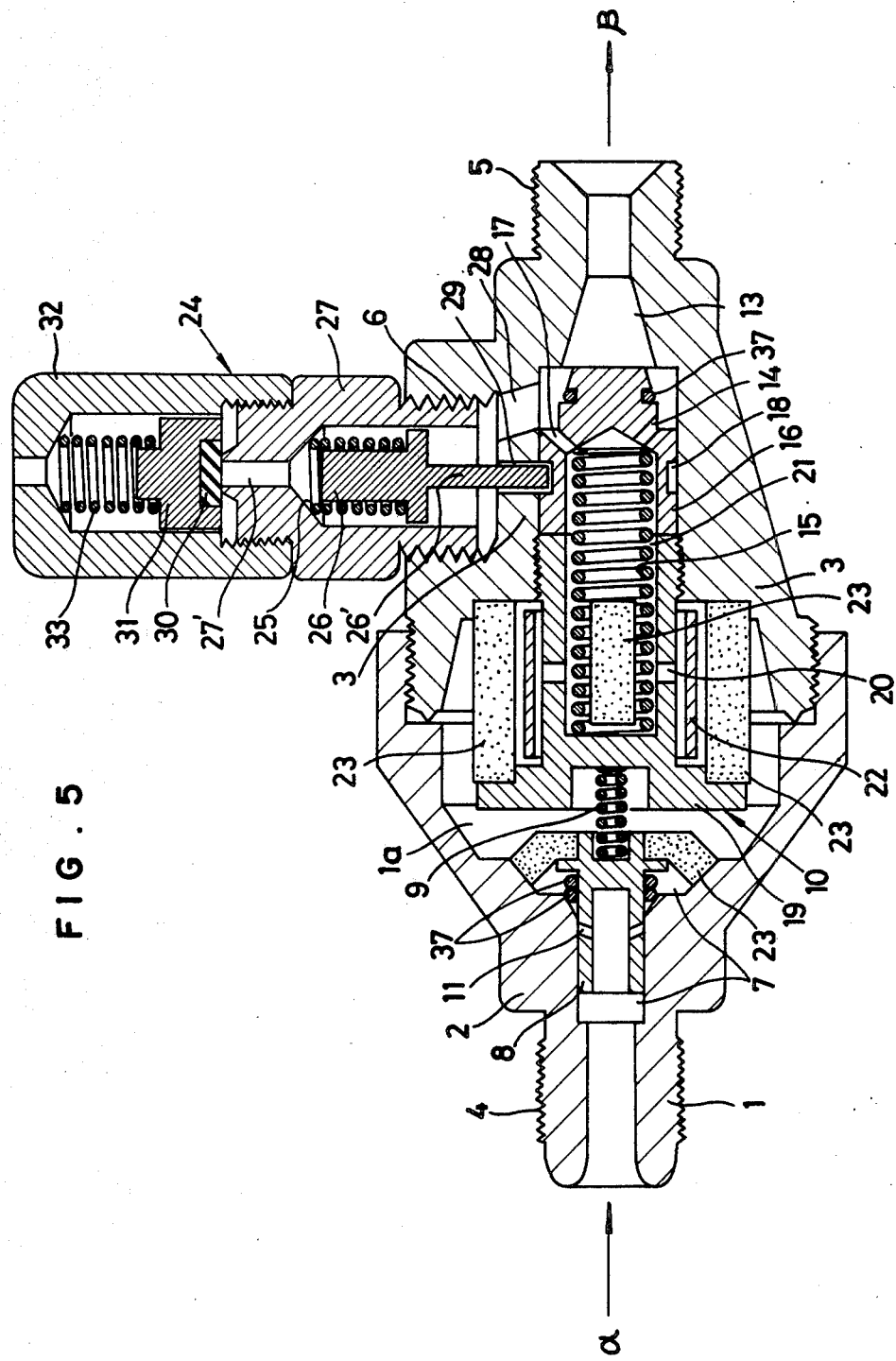
FIG. 5 is a partial longitudinal section view showing another embodiment of the apparatus of the present invention.

For example, when the counter pressure during the counter fire is used to immediately operate the check valve 8 to thereby close the gas flow inlet 7, the filter 23 may be mounted integrally on the rear face of the check valve 8 as shown in FIG. 5. In this case, since the counter pressure through the counter fire works immediately upon the rear face of the filter 23, the gas flow inlet 7 of the check valve 8 can be rapidly closed. Also, the carbon sludge is very effectively removed by this filter arrangement.

Also, the use of fibrous stainless steel or other metal for the filter 23, particularly, for the filter 23' inside the filter case 19 is effective in buffering the impact waves during counter fire or in extinguishing the counter flames.

Figure 6:
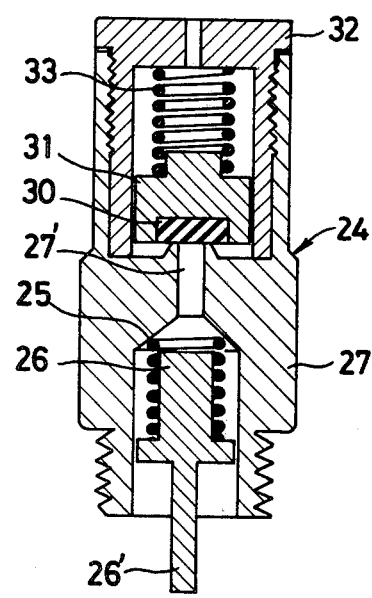
FIG. 6 is a longitudinal section view showing a further embodiment of the safety apparatus of the present invention

As shown in FIG. 6, the safety apparatus 24 may be constructed through screwing of the cap 32 with the inner side of the bush 31. Alternatively, the cap 32, the spring 33 and the bush 31 installed inside the cap 32 may be omitted.

As described hereinabove, the automatic emergency stop apparatus for preventing the counter flow and counter fire in accordance with the present invention can effectively: (1) prevent counter flow; (2) buffer the impact waves created during production of the counter fire; (3) prevent counter flame diffusion; and (4) remove carbon sludges.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An automatic emergency stop apparatus for protecting against the dangers of counter flow and counter fire of gas comprising:
   a hollow valve body including a gas flow inlet and gas flow outlet;
   a check valve means positioned adjacent said gas flow inlet said check valve means including a spring biasing said check valve toward a closed position;
   a cut-off valve means positioned adjacent said gas flow outlet said cut-off valve means including a spring biasing said cut-off valve towards a closed position;
   a filter means positioned between said check and cut off valve means;
   a safety apparatus communicating with the interior of said valve body, said safety apparatus including a plunger means adapted for engagement with said cut-off valve means;

wherein in an operative normal gas flow state, said plunger means engages with said cut-off valve means and maintains said cut-off valve means in an open position, and in an emergency stop state said plunger means is moved out of contact with said cut-off valve means permitting said cut-off valve means to close under the force of said cut-off valve biasing spring to stop the flow of gas.

2. An automatic emergency stop apparatus for protecting against the dangers of counter flow and counter fire of gas as claimed in claim 1, wherein said filter means includes filters provided on one of at least the inner and outer sides of said filter means.

3. An automatic emergency stop apparatus for protecting against the dangers of counter flow and counter fire of gas as claimed in claim 1, wherein an annular groove is formed on the periphery of said cut-off valve means, a tip of said stopper being elastically biased into engagement with said annular groove by a spring.

4. An automatic emergency stop apparatus for protecting against the dangers of counter flow and counter fire of gas as claimed in claim 1, wherein two rubber O-rings are provided on the outer periphery of said check valve means.

5. An automatic emergency stop apparatus for protecting against the dangers of counter flow and counter fire of gas as claimed in claim 2, further comprising a flow obstruction plate installed between inner and outer filters provided in the filter means.

6. An automatic emergency stop apparatus for protecting against the dangers of counter flow and counter fire of gas as claimed in claim 2, wherein said filters are made of a sintered metal, which is formed through sintering of a metal such as stainless, nickel, chromium, titanium or the like.

* * * * *